March 11, 1952  G. L. McCAIN  2,588,751
ELECTROMECHANICAL TRANSMISSION
Filed Jan. 27, 1949  6 Sheets-Sheet 1

INVENTOR.
George L. McCain.
BY
Harness and Harris
ATTORNEYS.

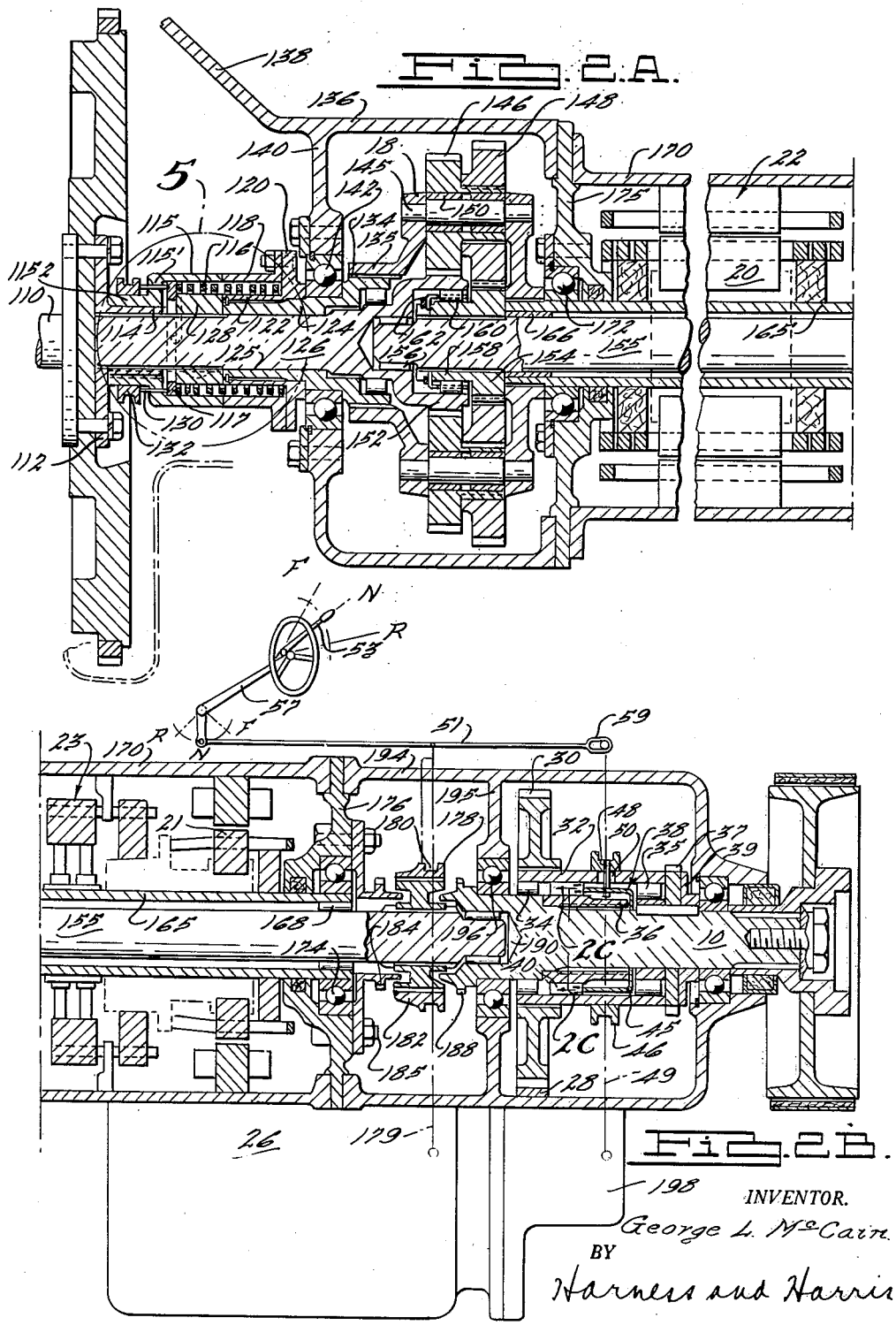

March 11, 1952  G. L. McCAIN  2,588,751
ELECTROMECHANICAL TRANSMISSION
Filed Jan. 27, 1949  6 Sheets-Sheet 3

INVENTOR.
George L. McCain.
BY
Harness and Harris
ATTORNEYS.

March 11, 1952  G. L. McCAIN  2,588,751
ELECTROMECHANICAL TRANSMISSION
Filed Jan. 27, 1949  6 Sheets-Sheet 4

INVENTOR.
George L. McCain.
BY
Harness and Harris
ATTORNEYS.

March 11, 1952 G. L. McCAIN 2,588,751
ELECTROMECHANICAL TRANSMISSION
Filed Jan. 27, 1949 6 Sheets-Sheet 5

INVENTOR.
George L. McCain.
BY
Harness and Harris
ATTORNEYS.

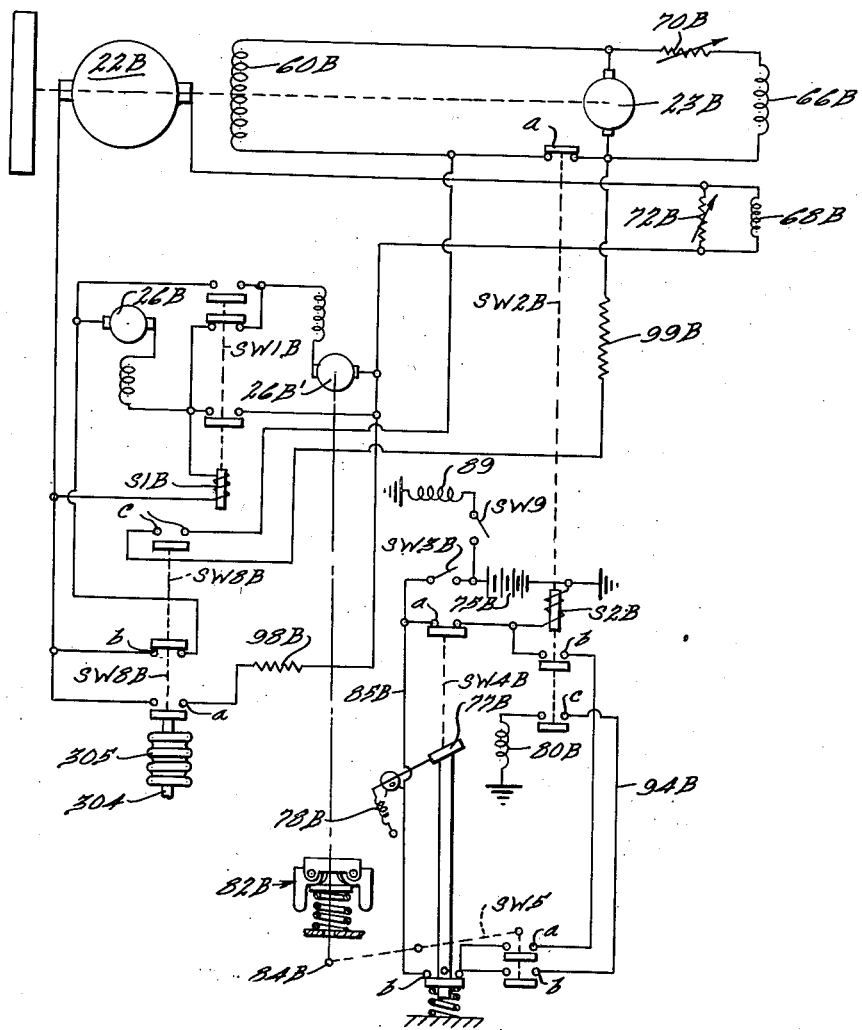

Patented Mar. 11, 1952

2,588,751

UNITED STATES PATENT OFFICE 2,588,751

ELECTROMECHANICAL TRANSMISSION

George L. McCain, Detroit, Mich., assignor to Chrysler Corporation, Highland Park, Mich., a corporation of Delaware Application January 27, 1949, Serial No. 73,141

21 Claims. (Cl. 74—686)

This invention relates to power transmission systems of the electro-mechanical type. In its broader aspects it is concerned with the provision of improved power transmission mechanism of the automatic variable ratio type, adapted to be controlled by one of the mechanisms disclosed in copending applications, Serial Nos. 681,630 and 768,118, filed July 6, 1946, and August 12, 1947 respectively, in the name of Paul T. Nims, and now U. S. Letters Patent Nos. 2,571,284 and Re. 23,314 respectively.

The present invention is closely related to copending application, Serial No. 3,847 filed January 23, 1948, in the name of Nims et al., and employs kindred control apparatus and gearing configurations. The description to follow covers, however, certain features and modifications of structure not stressed or else not specifically included in said copending application.

An important object of the invention is to provide novel, compact, rugged and efficient mechanism for use in a transmission of the indicated character, employing a planetary differential drive for simultaneously imparting torque to an electric drive system and to a mechanical drive component having mechanical connection with the rear wheels or other load, the arrangement being such as to impart to the driven wheels or load a variable ratio drive the characteristics of which are essentially dependent upon and changed to suit the torque demand upon the engine.

A related object is to provide such a transmission which employs a dual electro-mechanical high-torque drive of variable ratio and incorporates novel direct drive lock-up clutch means operable above a predetermined speed, and when the torque demand is not excessive to provide a positive mechanical two-way high speed drive, which may be direct and which eliminates all slip and losses incident to the electrical components during normal high speed operation.

Still another object related to that last noted is to provide such an electro-mechanical transmission having positive two-way mechanical drive.

A further object is to incorporate novel and improved regenerative braking means adapted to provide effective braking action when desired, through the drag of electrical components.

Still another object is to incorporate the essential mechanical components of such a transmission system in a compact rugged, easily serviced and relatively inexpensive assembly of unitary character, the arrangement of which is such that all important components are readily and independently accessible for servicing adjustment or replacement.

It is a further object of this invention to incorporate an improved freewheeling drive arrangement between the electric motors used during high-torque, low-speed driving and the propeller shaft, the parts being so disposed that the propeller shaft may be driven independently or jointly by either the prime mover of the vehicle alone (conventionally a gasoline engine) or by both the prime mover and the supplemental electric motor means previously referred to.

A further important object of the invention is to incorporate improved transmission means adapted to derive power from a prime mover such as a gasoline engine and to deliver the torque developed by the engine to a propeller shaft or other driven element through the agency of coacting mechanical and electrical driving means of novel character, the mechanical driving means serving both to deliver power directly to the propeller shaft or other driven element, and also to actuate in a novel and highly efficient manner electrical generating means so arranged that the electrical output thereof provides a driving connection of infinitely variable ratio between the engine and propeller shaft or driven element.

Other objects and advantages will become apparent upon consideration of the present disclosure in its entirety.

In the drawings:

Figs. 2A and 2B show in central, longitudinal section, the front and rear halves, respectively of an electro-mechanical transmission incorporating the principles of the present invention, some of the parts being diagrammatically indicated, and the views being designed to be read as if horizontally aligned, with Fig. 2A at the left;

Fig. 7 is a view similar to what a composite of

Figure 8:
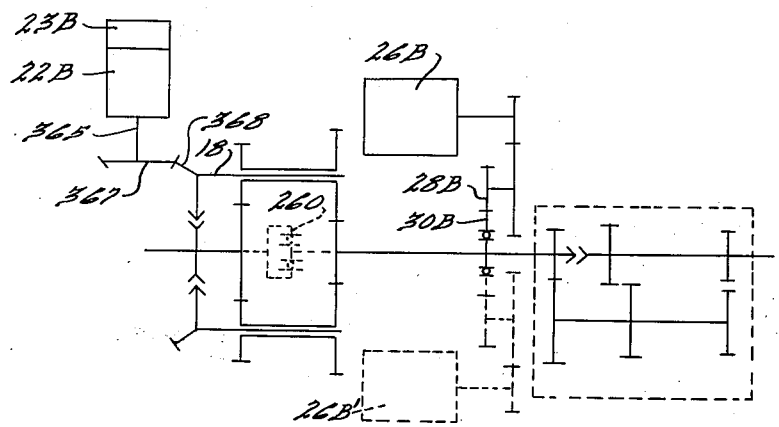
Figure 4:
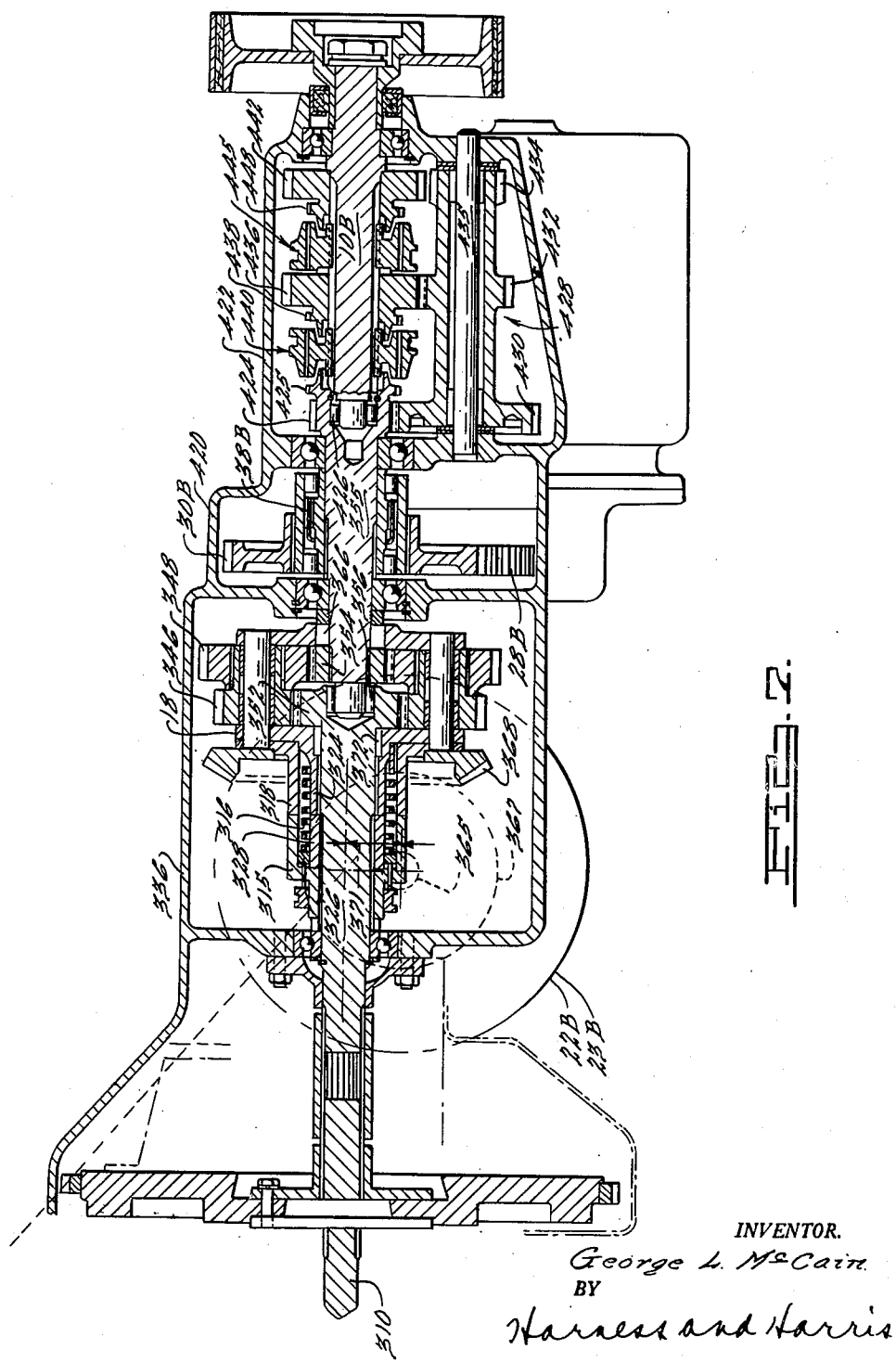

Figs. 2A and 2B would show, but showing a further modified construction suitable for full D. C. operation;

Fig. 8 is a schematic diagram of the principal mechanical components of the embodiment of Fig. 7; and Fig. 9 is a wiring diagram of the control system for the transmission of Fig. 7.

In respect to the drawings, and particularly to Figures 1 to 5 inclusive, reference character 2 designates a prime mover, which may be a conventional gasoline engine, shown at the front of a vehicle chassis, which is indicated only diagrammatically by the arrangement of the wheels and running gear, the engine being arranged to drive the rear wheels 4 through the conventionally arranged propeller shaft 10 and differential mechanism 14. It will be recognized that the character and arrangements of the components thus far mentioned may be varied considerably without departing from the present invention, which is concerned with the means for transmitting torque from the engine to the propeller shaft.

The embodiment of Figs. 1 to 5 inclusive is adapted for use with an A. C.-D. C. generating and control system similar to one of the types disclosed in the aforementioned Nims application, Serial No. 768,118, to which application reference may be had for a detailed discussion of the action of the electrical components. Essentially, the system includes an alternator 22 and exciter 23 driven by the engine 2 through planetary-differential gearing generally designated 8, an electric motor 26 which derives its power from the output of the alternator, and mechanical means for connecting either the engine alone or both the engine and the electric motor 26 to the propeller shaft 10. The electric motor 26 is a series wound D. C. motor which is connected to the propeller shaft by means of gears 28, 30, the former meshing with a pinion 67 fast upon the armature shaft of the motor 26 and the latter carried by the propeller shaft. An overrunning clutch, generally designated 36, may be disposed between the gear 30 and the propeller shaft, and means (presently to be described) is provided to lock up the overrunning clutch to effect a positive two-way drive at desired times.

The alternator 22 has two three-phase windings, the output of which is rectified by means of two banks of discontinuous type half-wave rectifier tubes, the tubes of one bank being designated V1, V2, and V3, and the tubes of the other bank V4, V5, and V6. The windings constituting one set of the two separate sets of three-phase alternator windings are designated A, B and C respectively and the corresponding windings of the other set are designated A', B', C', each winding of one set being 180° out of phase with the corresponding winding of the the other set. The outer ends of the Y-connected windings A, B, and C are respectively connected to the anodes of the rectifier tubes V1, V2, V3 respectively, while the outer extremities of the corresponding windings A', B', C' are connected, respectively, to the cathodes of the similar tubes V4, V5, and V6 of the other bank. The common terminals of the two Y windings of the alternator are mutually connected to one pair of contacts, a, of a series-parallel switch generally designated SW1, and connected individually to pairs of contacts b or c thereof. The cathodes of the left bank of rectifier tubes are connected to the aforesaid pair b of such contacts, and the anodes of the right bank of tubes are connected to aforesaid pair c of such contacts. Switch SW1 is actuable by means of a solenoid S1 to connect the two three-phase alternator windings either in series or in parallel, the parallel arrangement being employed for starting and the series arrangement after the vehicle comes up to speed. The output of the alternator is controlled by controlling the excitation of its field winding 60 by means of the exciter generally designated 23, and the rectified output of the alternator is fed to the motor 26. Such connection is effected by conductors 62, 64, the former of which is connected to the field coil 65 of the motor through a reversing switch RS which enables reversing the field and so the direction of rotation of the motor. The exciter is provided with two field coils 66, 68, field coil 68 being in series with the motor 26 and so disposed that the voltage therein bucks the voltage developed in the field coil 66, so that as the voltage in field coil 68 rises with the counter E. M. F. developed by the motor 26, the output of the exciter is reduced. The voltage developed in field coil 66 is also adjustably controllable by a series variable resistor 70, while the voltage developed in the bucking coil 68 is similarly adjustably controllable by a shunted variable resistor 72. The motor 26 and solenoid S1 are connected in shunt when the motor is energized, and both are connected in series with the rectifier output and bucking coil 68. When the voltage in solenoid S1 rises to a sufficient value, due to rising counter E. M. F. of the motor 26, it shifts the switch SW1 from the position shown in Fig. 4, wherein the two three-phase alternator windings are in parallel for starting, to a series arrangement for higher speed operation. When operating either in series or in parallel, the output of the exciter is regulated by the governing action of the bucking coil 68. Desired output characteristics are thereby imparted to the alternator in a well known manner, as will be apparent.

The circuit between the exciter 23 and alternator field coil 60 is adapted to be made and broken by the contacts a of a switch SW2 operable by a solenoid S2 connected in series with the vehicle storage battery 75 or other convenient source of power. In series with the battery and solenoid S2 is a manually operable switch SW3 which may comprise the ignition switch for the engine 2, or be engaged with the ignition switch for concurrent opening and closing. Also in series with the solenoid S2 are the contacts a of a throttle-operated switch assembly SW4. The throttle operating means is depicted in the form of a diagrammatically illustrated accelerator pedal 77 which is normally held in the raised or idling position by a spring 78 which also serves to hold the contacts a yieldably closed so that the circuit to solenoid S2 is completed whenever the switch SW3 is closed and the accelerator pedal is released. By virtue of this arrangement when the switch SW3 is closed, in order to start the engine 2, contacts a of SW4 are closed so long as the accelerator pedal is not depressed, and the circuit of field coil 60 is thereby held open at contacts a of SW2 by solenoid S2, and the alternator 22 delivers no output to the motor 26. When the engine 2 is speeded up by depressing the accelerator pedal 77 to open the throttle, the circuit to solenoid S2 is broken at the contacts a of switch SW4, permitting completion of the circuit between the exciter and the alternator field 60 by the resultant closure of contacts $a$ of switch SW2. Current generated by the alternator is then fed to the motor 26 in the manner previously described.

The switch SW2 also operates a second set of contacts $b$ and a third set of contacts $c$. The contacts $b$ are in a holding circuit for the solenoid S2 while the contacts $c$ are in an operating circuit for a clutch actuating solenoid 80. A double pole single throw governor switch SW5 has one pair of contacts $a$ in series with the contacts $b$ of switch SW2 and a second pair of contacts $b$ in series with the contacts $c$ of switch SW2. A governor mechanism generally designated 82 is provided, drivable by and in proportion to the speed of the propeller shaft 10 and so connected to the switch SW5, as by the linkage 84, as to close the contacts of switch SW5, when the vehicle reaches a predetermined speed, and keep them closed above such speed. It will also be noted that the switch SW4 incorporates a pair of contacts $b$ arranged in series with both pairs of contacts $a$ and $b$ of switch SW5 and connected to the power source 75 through the hand switch SW3 by a conductor 85. Contacts $b$ of SW4 are closed at all times except while the accelerator pedal is depressed to a kickdown position which may be beyond the fully open position of the throttle. By virtue of this arrangement, when the vehicle is accelerated by uninterrupted depression of the accelerator pedal to a speed above the governor-actuated closing speed of the switch SW5, contacts $b$ and $c$ of the switch SW2 remain open so long as the accelerator pedal 77 is depressed. If the throttle is allowed to close momentarily, however, by releasing the accelerator pedal, while the vehicle is traveling above such speed, a circuit is completed from the power source through conductor 85, contacts $b$ of switch SW4, and contacts $a$ and $b$ of switch SW5 to the contacts $b$ and $c$ of switch SW2. Since the momentary release of the accelerator pedal has closed the contacts $a$ of switch SW4 and completed the circuit to solenoid S2, the contacts $b$ and $c$ of switch SW2 have been closed almost instantaneously with the contacts $a$ of switch SW4. Accordingly, the current to the solenoid S2 is maintained (so long as the car speed is above the critical value mentioned and the kickdown contacts $b$ of SW4 are not opened) through the holding circuit comprising conductor 85, contacts $b$ of switch SW4, contacts $a$ of switch SW5, conductor 92 and contacts $b$ of switch SW2. A circuit is also maintained in the same manner to the solenoid 80 by way of the contacts $b$ of switch SW5, conductor 94 and contacts $c$ of switch SW2. The solenoid 80 initiates and maintains engagement of a direct drive clutch presently to be considered in greater detail. The direct drive clutch effects direct mechanical connection between the engine 2 and the propeller shaft 10, so that after such momentary throttle closure and reopening of the throttle sufficiently to keep the vehicle traveling at a speed above the critical governor-actuated closing speed of switch SW5, the vehicle proceeds in direct drive and the electromechanical transmission mechanism is rendered ineffective.

It will be noted that during such direct drive operation, with the accelerator depressed, the contacts $a$ of switch SW2 are held open, disabling the alternator 22 so that the motor 26 is no longer energized and the propeller shaft may overrun the motor 26 at the overrunning clutch 38.

When, with the accelerator still depressed, the vehicle speed falls to such value that the switch SW5 is opened by the governor 82, the solenoid S2 is deenergized and the electrodynamic torque multiplying drive is reinstituted, the holding circuit and the direct drive clutch circuit being simultaneously opened by the switch SW5, while contacts $a$ of switch SW2 again close to cause excitation of the alternator field and again supply power to the electric motor 26.

Important structural features of a preferred embodiment of the invention are shown in Figs. 2A, 2B, 2C, and 3. The engine shaft 110 drives, through the flywheel flange assembly 112 and its hub 114, a cylindrical clutch housing sleeve portion 115 forming part of a coil spring clutch assembly. The sleeve section 115 constitutes the forward half of the outer casing for the helical power transmitting spring 116, while a mating coaxial sleeve section 118 houses the rear half of the spring. The rear spring sleeve section 118 is bolted to a flange 120 formed integrally with an inner sleeve 122 which projects forwardly through the interior of the spring 116 a distance such that its end is aligned with the forward end of the outer rear sleeve section 118. Sleeve 122 may be keyed to a hub portion 124 journaled, as on the smooth bearing 125, upon the transmission input shaft 126, which is also keyed to hub 114. A forward inner sleeve portion 128 which is fitted into the forward outer sleeve portion 115 lies within the forward half of the driving spring 116 and is keyed to the shaft 126 so that the parts 114, 115, and 128 turn as a unit with the shaft 126. Inner sleeve portions 122, 128 are of the same diameter and end-abutting so as to form a continuous internal cylindrical support for the spring, while the inner surfaces of the outer sleeves 115, 118 similarly form a smooth and essentially continuous cylinder. At its rear extremity the driving spring 116 is positively secured to the sleeve assembly 118, 122 to turn therewith at all times. The spring is of such radial thickness and of such stiffness that it does not when relaxed grip any of the sleeve surfaces, and the spring may turn freely between sleeves 115, 128, permitting independent rotation of the engine shaft 110 and the planet carrier 18 with respect to one another in either direction. At the forward end of the spring is a plurality of longitudinally slidable fingers 130 movable to project more or less through a forward wall 115$^1$ formed integrally with sleeve 115, so that the rear ends of such fingers may engage the ring 117, keyed to the front end of the spring. The fingers are actuated by a longitudinally slidable ring 132 mounted on the reduced forward hub portion 115$^2$ of the sleeve 115, the ring being actuatable by a shifter yoke (unshown) movable by the solenoid 80.

The rear extremity of the hub portion 124 is enlarged and provided with external splines as indicated at 134 to provide a driving connection with the carrier 18 of a planetary gear system housed within a compartment 136 formed integrally with the casing 138 which also houses the spring clutch means, but separated therefrom by a partition 140 which also supports an antifriction bearing assembly 142 serving as journaling means for the hub 124. The rear extremity of the hub assembly 124, 134 is fitted into the conformably internally splined hub portion of the planet carrier 18.

Figure 5:
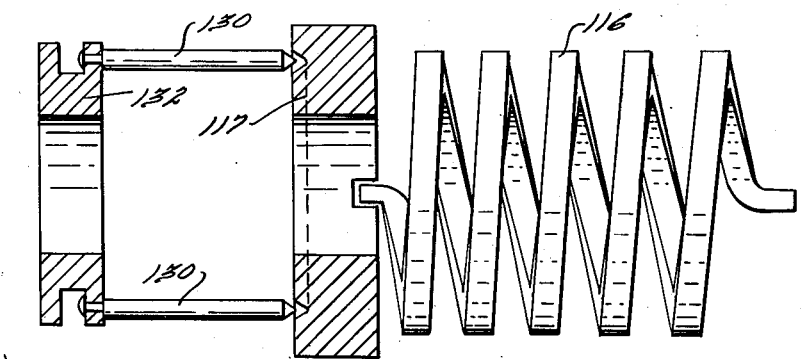
Fig. 5 is a configuration view of certain essential elements of the spring clutch.

In reference to Fig. 5 for the operation of spring clutch 130, it must be recalled that the spring proper and the ring 117 are keyed to the carrier assembly 18 and turn with it at all times. The fingers 130 and ring 132 are fast to the engine shaft 126. If the forward, free end of the spring is frictionally restrained, however, while it is being rotatively driven from the rear, or if frictional drag means is rotatively driven while engaging the forward end of the spring, the spring is resultantly expanded or contracted in accordance with the relative direction of rotation, to cause the spring to grip either the inner or the outer sleeve surfaces and transmit a drive from one to the other. That is to say, if the carrier is rotating faster than the engine shaft such that the latter is relatively stationary and then the solenoid 80 is energized so as to cause fingers 130 to press against ring 117, a drag will be exerted on the ring and consequently on the spring 116. The spring will tend to uncoil and engage outer sleeve 115 with the result that the engine shaft assembly is brought up to the speed of the carrier assembly through the agency of the spring. On the other hand, if the engine shaft is rotating faster than the carrier assembly such that the latter is relatively stationary and then the solenoid 80 is energized, the ring 117 will exert a drag on the fingers with the consequent reaction that the spring 116 tends to wind up and the coils to become smaller. Accordingly, the spring will wrap tightly around inner sleeve 128 and cause the engine shaft speed to be imparted to the carrier assembly.

The spring clutch is thus rendered a two-way clutch, i. e., so long as the fingers are actuated by solenoid 80, the clutch transmits drive in either direction, notably engine shaft to carrier or carrier to engine shaft.

The carrier supports a plurality of longitudinally extending planetary pinion shafts 145 upon each of which is a pair of planet pinions as 146, 148, the two pinions of each pair being interkeyed or otherwise secured together to turn as a unit. Bearing means 150 is interposed between each such pair of pinions and it shaft 145. In each instance the forward pinion 146 is smaller than the rear pinion 148. The smaller forward pinions 146 mesh with an orbit defining gear for the planets comprised by a sun gear 152, which is hollow and which is rigidly carried by the rear extremity of the engine-driven shaft 126. The planet pinions 148 mesh with an orbit defining gear for the planets comprised by a sun gear 154, which is keyed to or otherwise made fast upon the main transmission shaft 155, the forward end of which is piloted in the hub of the front sun gear 152, as by the bearing means 156. A forwardly projecting extension 158 of the hub of the rear sun gear 154 forms the inner cam element of a roller-type overrunning clutch which is housed within the hollow interior of the forward sun gear 152, while the inner surface of sun gear 152 is contoured to form the other wedging element of such overrunning clutch, the rollers 160 being interposed in the usual manner and positioned by a cage 162. The overrunning clutch just described is so arranged that the forward sun gear 152 is permitted to turn forwardly faster than the rear sun gear 154, but such sun gears are locked together by wedging of the rollers 160 when the rear sun gear tends to rotate forwardly faster than the front sun gear.

At its rear extremity the planet carrier 18 is splined to a tubular shaft 165 concentric with the shaft 155 and carrying fast thereupon the rotors 20, 21 of the alternator and exciter respectively. The hollow shaft 165 is journaled upon the shaft 155 by the bearing means 166, 168 located near the ends of the hollow shaft. The alternator and exciter, and the shaft portions 155, 156 extending therethrough, are housed in a casing portion 170 secured to and extending rearwardly from the casing portion 136. Shaft 165 is journaled in anti-friction bearings 172, 174 supported by the forward and rear partitions 175, 176 respectively which define the end closures for the casing section 170. The shaft 155 projects through and from the rear partition 176 and carries slidably splined thereupon a dog-toothed clutch element 178 provided with an external groove 180 so arranged that the clutch member may be conveniently operated by conventional shifter fork means or the equivalent (not shown). A lever for moving the fork and clutch member is diagrammatically indicated at 179. Clutch element 178 is movable forwardly to engage its forward toothed portion 182 with a cooperatively toothed fixed clutch portion 184 rigidly attached to the partition 176 as by studs 185.

When the clutch element 178 is moved to the rear extremity of its sliding movement, its toothed portion 182 engages a conformably toothed portion 188 carried by the forward extremity of the tail shaft 10, which is also socketed as indicated at 190 to provide a pilot bearing for the rear extremity of the shaft 155. When the clutch element 178 is in the neutral position in which it is shown in Figure 2b, no mechanical drive can be transmitted to the tail shaft and transmission shaft 155 may spin freely. Clutch element 178 is housed in a casing extension portion 194 secured to and extending rearwardly from casing section 170 and the partition 176. Casing section 194 is divided intermediate its length by a transverse partition 195 which supports an anti-friction bearing 196 journaling the forward extremity of the shaft 10 and defining a forward compartment containing the clutch element 178 and associated elements, and a rear compartment containing the electric motor driving gear 30 and the overrunning clutch generally designated 38.

Figure 1:
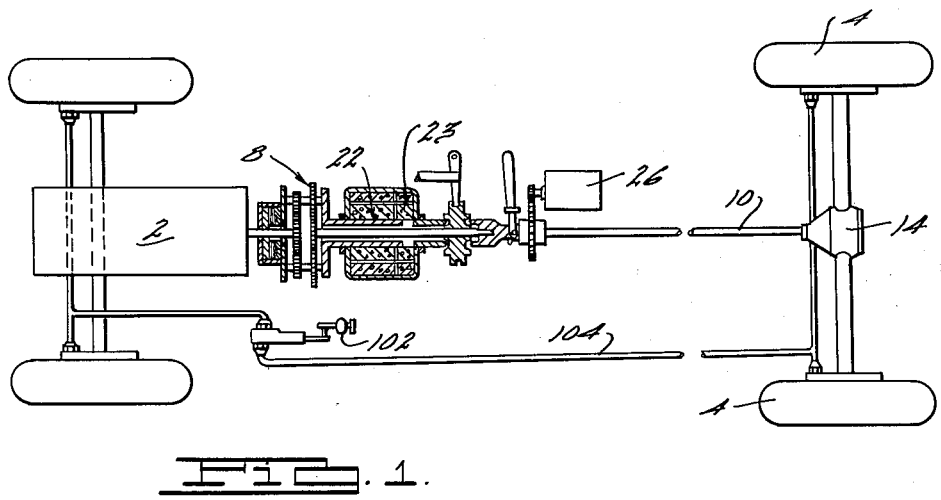
Fig. 1 is a diagrammatic plan view of a motor car propulsion system incorporating the principles of the present invention.
Figure 3:
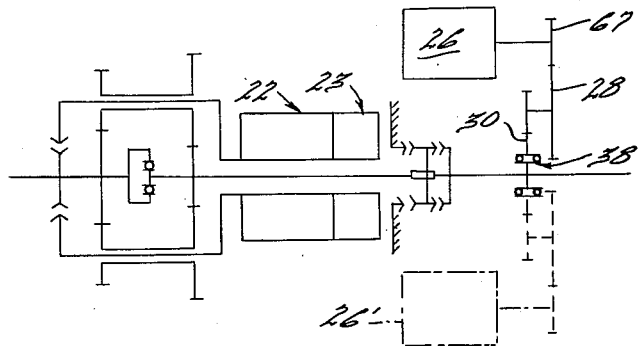
Fig. 3 is a schematic diagram of the principal mechanical components of the transmission of Figs. 2A and 2B.
Figure 2C:
Fig. 2C is a sectional detail taken substantially on the line 2C—2C of Fig. 2B and looking in the direction of the arrows.

Gear 30 is fast upon a sleeve 32 journaled on the propeller shaft, as upon roller bearings 34, 35, the sleeve being substantially larger than the shaft so as to be spaced outwardly from the shaft by such bearings, to accommodate within the sleeve and between such bearings the overrunning clutch components, consisting of an inner sleeve or cam assembly 36 keyed to the propeller shaft, rollers 40 interposed between the sleeves in the conventional manner and adapted to permit the electric motor to drive the propeller shaft forwardly while allowing the propeller shaft to overrun the electric motor, and means for locking the rollers to provide a two-way or reversible drive between the electric motor and the propeller shaft, such lockup means for the overrunning clutch including means for sliding the rollers 40 longitudinally from their normal overrunning position in which they are shown in Fig. 2B to a lockup position in which they serve as positive keys for driving the propeller shaft sleeve 36 in either direction. When so moved to the left, the rollers fit between relatively short projecting teeth 42, Fig. 2C, carried by sleeve 36 and defined and connected by relatively gradual and shallow concave portions of substantially cylindrical cross section which slope upwardly uniformly in both directions from their deepest mid portions, such concave portions being designated 44 and being of such character that the rollers tend to roll up the same towards the peaks of the teeth 42 to provide a wedging drive in either direction. Longitudinal sliding movement of the rollers is induced by sliding their confining cage 45 through the agency of a slotted collar 46 slidably fitted upon the sleeve 32 and having a pin as 48 projecting radially inwardly from the collar through a longitudinal slot 50 in the sleeve 32 and into the cage 45. A shifting yoke (unshown) or other conventional or suitable means may be used for moving the collar and cage to shift the rollers in the manner described.

Behind sleeve 36 on tailshaft 10 and keyed thereto in a similar manner, come the inner race for roller bearings 35, a drive gear 37 for the governor mechanism, and an attendant drive gear flange member 39.

The actuating yoke for the lockup sleeve 46 of the overrunning clutch 38 is operable through the agency of a lever 49, and the levers 49, 179 are provided with common actuating means including a link 51 which may be actuatable by means of a suitably positioned hand lever as 53 mounted, for example, on the steering column 57 of the vehicle. The link 51 has a slotted portion 59 providing lost-motion connection with the lever 49 so that the rollers 40 of clutch 38 are moved forwardly to the lockup position simultaneously with movement of clutch member 178 to the forward position in which it locks up the shaft 155, while the overrunning clutch rollers are moved to their rearward, operative position when clutch member 178 is in either the neutral position or the rearward, direct drive position.

The rear compartment of casing section 194 also communicates interiorly with the space within the rear end cover 198 of the motor 26, within which cover the driving pinion 67 of the electric motor is housed and by virtue of which intercommunication said pinion may mesh with the gear 28. As previously indicated, the overrunning clutch 38 is so constructed that by shifting the collar 48 it may provide either a one-way forward-operating driving connection between the electric motor and the tail shaft or a positive two-way drive.

In considering the operation of this embodiment of the invention it will be noted that the high torque drive employed for starting and accelerating the vehicle at lower speeds is instituted with the toothed clutch element 178 in its rearward position in which it provides positive driving connection between the shaft 155 and the tail shaft 10, and the increase of driving speed ratio of the transmission up to and including direct drive occurs without disturbing the position of this clutch member, which need only be moved to establish neutral or reverse. Thus the hand lever 53 need only have three positions, viz: forward, neutral and reverse. Upon starting, the coil clutch spring 116 is released so that the cage 18 is free to turn faster than the driving shaft. The engine turns the sun gear 152 at engine speed and since the inertia of the vehicle opposes rotation of the sun gear 154, and so opposes independent rotation of planet pinions 148 about their own axes, the sun gear 152 turns the pinion assemblies 146, 148 bodily forwardly, causing the gear 148 to roll forwardly upon the sun gear 154 at an increased speed due to the relative sizes of the gears. The planet pinion shafts and the cage 18 are accordingly turned forwardly at a speed in excess of that of the driving shaft 126 and such rotation of the cage turns the rotors 20, 21 of the alternator and exciter respectively. With the contacts $a$ of switch SW2 closed for acceleration in electric drive in the manner previously described the power required to drive the alternator imposes a drag upon the cage 18, and the reactive force of this drag tends to turn the sun gear 154 and connected shaft 155 and tail shaft 10 forwardly, due to the fact that the arresting or partial arresting of rotation of the cage 18 allows the planet pinions 146, 148 to turn backwardly about their own axes in response to forward rotation of the front sun gear 152, and the rearward rotation of planet pinions 148 transmits a forward rotation to gear 154. As the speed of the alternator increases and its output, fed to the motor 26, causes the latter to accelerate the vehicle, acting through the gears 28, 30 in the manner previously described, torque is also directly applied to the tail shaft through the reactive action of the planetary gearing, in the manner previously described. It will also be noted, however, that the alternator may turn faster than the driving shaft, and that when the drag of the alternator is sufficiently high, the reactive torque may transmit a drive to the tail shaft which brings the tail shaft up to the speed of the driving shaft or might even tend to cause it to rotate faster than the driving shaft. Due to the presence of the overrunning clutch 160, however, the tail shaft cannot turn faster than the driving shaft, and it will also be appreciated that with the clutch 178 in its normal forward drive position in engagement with clutch portion 188, the tail shaft tends to turn the engine through the overrunning clutch 160 to provide engine braking whenever the rear wheels tend to turn faster than they would be driven by the engine. This arrangement also insures synchronization of the driving and driven parts of the coil spring clutch at the time it engages to establish the direct drive, since such engagement is effected in response to momentary closure of the throttle when the vehicle is traveling above a predetermined speed, as previously described. Upon release of the accelerator pedal under normal conditions, the rear wheels will tend to drive the engine, and the driving and driven parts will be synchronized at the overrunning clutch 160, as previously noted. There will thus be no tendency to overheat the parts of the spring clutch due to drag. Since the sun gears 152, 154 will then be turning at the same speed, the cage 18 will be locked thereto and will also be turning at the same speed as the tail shaft, and will thereby also turn the engine-connected shaft 126 at the same speed. When the accelerator pedal is again depressed, tending to speed up the engine and to drive the parts forwardly in the opposite direction, which would tend to release the overrunning clutch 160, the coil spring 116 is engaged by the action of the solenoid 80 concurrently with the closing of contacts $a$ of accelerator pedal operated switch SW4 in the manner previously described. It is also to be observed that the solenoid 80 remains energized during direct drive operation, so that there is a constant tendency to re-energize the spring 116 and cause the same to bind again immediately, if it should be released while the vehicle is operating in direct drive.

As the vehicle slows down to such speed that a downshift to electro-mechanical drive is called for, the switch SW5 opens, deenergizing the direct drive clutch solenoid 80. The characteristics of this clutch are such that when the fingers 130 are withdrawn so that they no longer exert their restraining effect upon the end of the spring 116, the spring releases itself even though it is transmitting full torque. Spring clutches of this type and having this characteristic are commercially available and are well known in the art. This action re-establishes the planetary gear differential drive of the generating means and tail shaft required for the higher torque drive.

Dynamic braking is introduced whenever the accelerator is released with the car moving forwardly and the hand lever 53 in the forward drive or "F" position. The action involved may be the same as that set forth in the aforementioned Nims et al. application, Serial No. 3,847. When the vehicle is moving forwardly at a speed above that at which switch SW5 is closed by the governor 82, release of the accelerator pedal 77 results in closing of contacts $a$ of switch SW4 and resultant closing of contacts $b$ and $c$ of switch SW2. Contact $b$, it will be remembered, energizes the holding circuit for solenoid S2 and contact $c$ energizes the spring clutch actuating coil 80. This engagement of the spring clutch causes the carrier 18 to be locked to the engine. The clutch 178 is at this time providing a direct drive between the tail shaft 10 and the inner cam element 158 of the overrunning clutch assembly located in the forward planetary train, as well as between the tail shaft and rear sun gear 154. Overrunning clutch rollers 160 thereupon lock and the tail shaft accordingly drives the engine and both sun gears 154, 152 forwardly. This action will be seen to lock up the double planetary gear train to the engine in addition to the already locked action afforded by the spring clutch. Hence engine braking is provided.

When the vehicle is moving forwardly at a speed below that at which switch SW5 is held closed by governor 82, release of the accelerator pedal 77 can have no effect on the spring clutch in the fashion described above. In that situation, the contact $b$ of switch SW5 would be open already thereby rendering the circuit to the spring clutch solenoid disabled altogether.

For reverse operation, hand lever 53 is moved to shift the clutch element 178 forwardly to lock the shaft 155 stationary by engagement of clutch element 178 with clutch teeth 184, and roller clutch 38 is simultaneously locked up in the manner previously described. The rear sun gear 154 is thereby locked, and the planet pinions 148 roll thereupon as the cage is driven by the engine. The alternator is thus operative, and when the reversing switch RS is thrown to the reverse position, motor 26 is driven rearwardly to turn the tail shaft in a reverse direction and back the vehicle.

Provision for parking braking by the engine may be easily made by employing auxiliary sprag means discussed in connection with subsequent embodiments (Figure 9).

Figure 6:
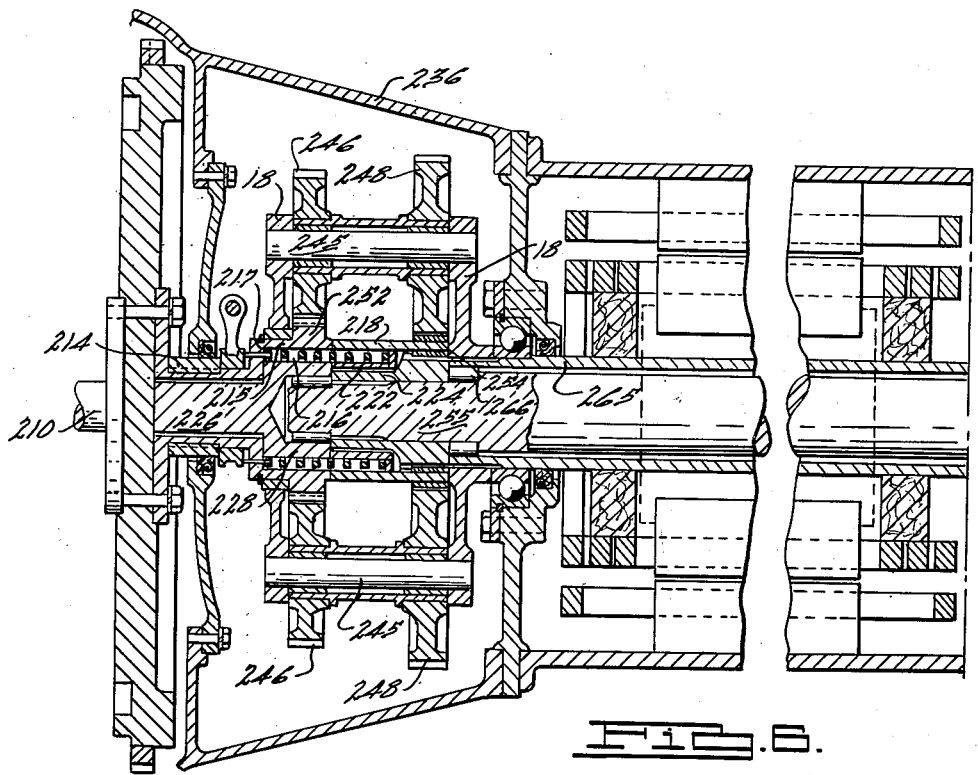
Fig. 6 is a view similar to Fig. 2A but showing a somewhat modified construction suited for greater compactness.

In respect to Figure 6, there is shown a modification of the two-way spring clutch wherein the device lies situate inside the planetary set. The forward half 215 and 228, may be observed to be fixed to the shaft 226 and the forward sun gear 252 to be made integral with the aforementioned element 215. The rear half 218, 222, and 224 of the spring clutch device is fast to the transmission shaft 255 and the rear sun gear 254 is integral with the aforementioned element 218. The modified planets 246 and 248, although keyed together as formerly, are spaced somewhat further apart and the new pinion shaft 245 for them is lengthened. It is to be noted that the roller type overrunning clutch 160, which was inside the planetary set, Figure 2A, is dispensed with. The carrier 18 is fast to hollow shaft 265 as was the previous arrangement, these two members being spaced from the transmission shaft 255 by the same type bearing 266. The new compartment 236 represents not only its counterpart of the former structure but also a portion of the forward casing combined therewith.

Figure 4:
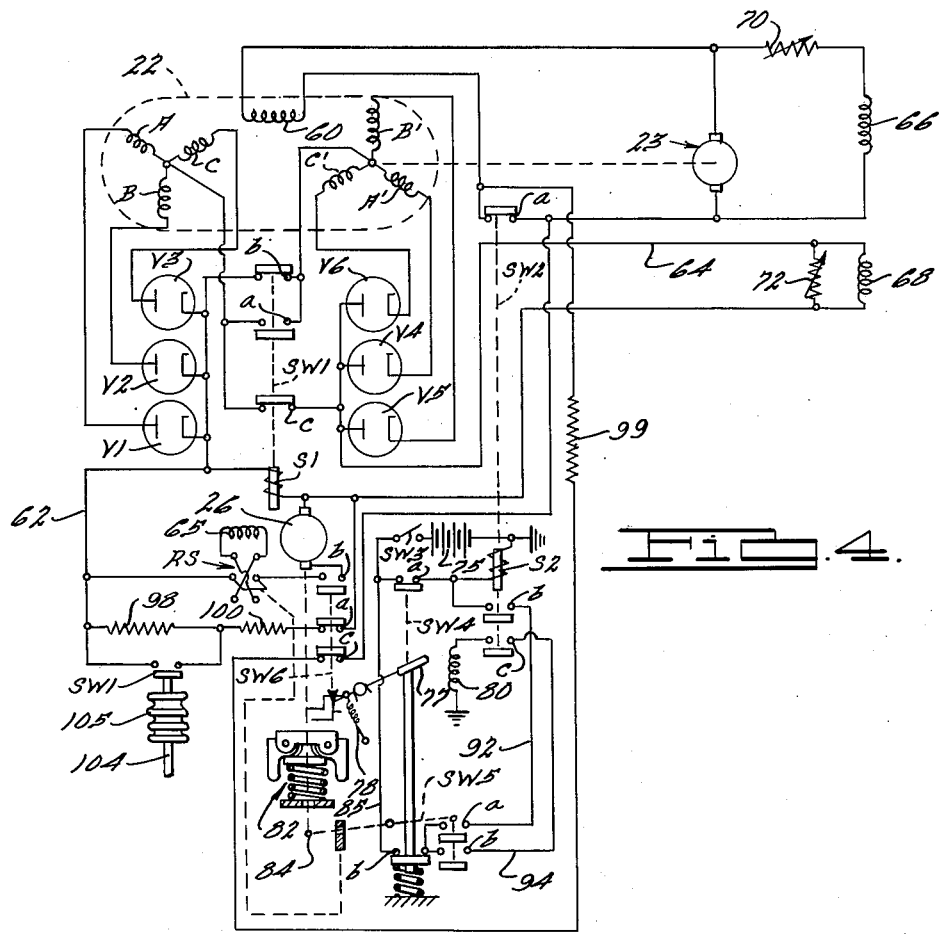
Fig. 4 is a schematic wiring diagram of the electrical components of the transmission, also showing certain of the mechanical parts.

The modification of Figure 6 will operate with the same type control system as afforded by the circuits of Figure 4. During the acceleration period in which the governor 82 has not come up to its speed setting, the spring clutch 216 is not actuated and the forward sun 252 can, in the sense of the first construction shown, overrun the rear sun 254. Due to the combined effect of the alternator, i. e., its output being fed directly to the tail shaft by the motor means and its reactive torque acting upon the rear sun gear 254, the vehicle may gain speed until the governor operates. Switch SW5 is then closed to prepare the spring clutch actuating circuit 94.

When the accelerator pedal 77 is momentarily released to effect the straight drive after sufficient vehicle speed has been attained, contact $a$ of switch SW4 is closed, solenoid S2 is energized, and switch SW2 is actuated. The contacts $a$ of switch SW2 open to disable the alternator 22, while contacts $b$ and $c$ operate to close the holding circuit for solenoid S2 and close the circuit to actuate spring clutch 216. The sun gears 252 and 254 are locked together thereby to afford a straight drive through the planetary system, while the alternator, disabled, idles with the carrier 18 at a one-to-one ratio with the shafting 226, 255, and 210.

Accelerator pedal 77 may be again depressed to resume control over the engine speed by the operator. Any release of the pedal thereafter when the vehicle speed is above that of the governor setting has no effect to interfere with the straight drive maintained by the spring clutch 216. Under these conditions any braking of the rear wheels afforded by the engine is on a one-to-one basis.

In the event of a downshift, however, the spring clutch 216 circuit is deenergized, the sun gears 252 and 254 are unlocked from each other, and the electro-mechanical drive from the alternator comes into being. Release of the accelerator pedal at these advanced speeds restores the one-to-one operation by means of switch SW4 and engine control may be assumed again by the operator.

A unique feature of the embodiment of Figure 6 is made possible with the type control of Figure 4. It is apparent that when the vehicle is being accelerated from standstill in electromechanical drive and the accelerator pedal is released, so long as the forward speed is below that set for the governor, the alternator is disabled and the spring clutch 216 is inactive. Accordingly the rear sun gear 254 and rear wheels rotate with no drag on them from any source, i. e., the alternator or the engine. Such a free wheeling condition is of advantage to the operator at the low vehicle speeds involved and the motion of the vehicle may readily be arrested as desired upon application of the wheel brakes.

The question may logically arise at this point as to the outcome regarding the free wheeling when, under conditions described in the foregoing paragraph, a long slope in the road happens to be encountered. Engine braking is automatically instituted, though, so soon as the critical speed for the governor is attained since release of the accelerator pedal prepares the spring clutch solenoid and clutch 216 for planetary lockup.

At all speeds below that speed set for the governor, the spring clutch 216 is inactive and relative rotation is permitted between the mating members of the planetary gear train.

Should it be desirable to put the engine when dead into operation by such means as a towed start, auxiliary means (not shown) for locking up the planetary set may be easily provided. A simple expedient would be a separately operated switch and circuit from the battery to the solenoid of the spring clutch. However, if reliance upon the battery is sought to be avoided, a mechanical linkage to the shifter yoke for the clutch ring 217 may be provided for use of the operator.

This same auxiliary means may be employed after the vehicle is parked to lock the wheels to the engine and provide parking braking.

In Figures 7, 8, and 9 is shown an additional modification of the invention. Designed for full D. C. operation, i. e., for the use of a D. C. generator and a pair of D. C. motors to provide the electric drive, this construction is readily apparent to have principles equally suitable for use with an A. C.-D. C. circuit such as that shown in Figure 4. With the latter, an alternator, rectifying means, and one motor, 26, are used. With the former, that of Figure 9, a D. C. generator and two motors, 26B and 26B′ dotted, are used. The D. C. generator is generally designated 22B.

In this embodiment, two series wound electric motors 26B and 26B′ are employed. Torque from motors 26B and 26B′ is applied to a common gear 30B through appropriate motor drive transmitting gearing including a pinion 28B which meshes directly with gear 30B. Gear 30B is mounted on a drive shaft 355 and connected thereto through an interposed overrunning clutch 38B in a manner analogous to the arrangement of the corresponding parts of the embodiment of Figures 1 to 4.

The electrical control system is arranged in such manner that the motors may be placed in series for starting, to reduce the starting current, and then thrown to a parallel arrangement for running, the series-shunt switch being designated SW1B and operable similarly to the switch SW1 of the embodiment first described, through the agency of a solenoid S1B, although it acts upon the motors rather than the generator windings and is adapted to be thrown from series to parallel when the voltage reaches a predetermined value, rather than from parallel to series. The output of the D. C. generator 22B is fed to the motors 26B and 26B′ through a series-shunt switch SW1B. Operation of switch SW1B is such that motors 26B and 26B′ may be placed in series for starting, to reduce the starting current, and then thrown to a parallel arrangement for running. From the series position shown in Figure 9, the contacts of switch SW1B are moved into the parallel position through the agency of a solenoid S1B which causes the switch to operate when the voltage reaches a predetermined value. This arrangement follows in a manner which will be seen to be analogous to the arrangement of the parts of the first described embodiment, although of course, the rectifying means is eliminated. The exciter bucking field coil 68B is similarly connected in series with the D. C. generator 22B output to regulate the same through its action upon the output of the exciter, generally designated 23B.

It will be noted in connection with the use of two D. C. driving motors 26B and 26B′ employed in the high torque electro-mechanical drive, that only a single overrunning clutch 38B is required to free the electric motors and permit the driveshaft 355 to overrun them during higher speed operation.

With the arrangement shown in Fig. 7, a mechanical reverse is provided, to the end that no reversing switches need be necessary for the electric motors 26B and 26B′. The control circuit, shown in Figure 9, provides for dynamic braking only in response to actuation of the brake pedal; contrastingly, the control circuit of the first embodiment Fig. 4 is arranged to introduce dynamic braking not only upon actuation of the brake pedal but also to introduce a certain amount of dynamic braking upon release of the accelerator pedal. A possible objection to this two-source introduction of dynamic braking is the tendency of the vehicle to "creep" at normal stand-still conditions, and this objection is overcome by the circuit of Fig. 9. The aforementioned application Serial No. 3,847 of Nims et al. gives a more detailed treatment of these arrangements including a complete collation of them in the regard of dynamic braking.

The components of the transmission of Figure 2 will be seen to have been shifted around somewhat in the embodiment of Figures 7 and 8 in an effort to obtain even greater compactness. The D. C. generator-exciter unit 22B—23B is seen to be mounted transversely to the engine shaft 326 and offset somewhat below it. The unit 22B—23B is still geared direct to the carrier 18 of the planetary set, but through the medium of hypoid gearing. The generator-exciter driveshaft 365 may mount a hypoid pinion 367 which meshes with a hypoid gear 368 affixed to carrier 18. The offset of the hypoid, indicated by reference numeral 371, allows the unit 22B—23B to be located lower in level than what conventional means would permit. Thus is afforded a desirable saving in head room over the transmission as a whole.

The spring clutch 316 functions as in the first described embodiment allowing the carrier 18 to be locked to the engine shaft 326 and forward sun gear 352. Spring clutch 316 is located, along with the planetary gearset, in compartment 336. Communicating with this same compartment is generator-exciter driveshaft 365.

The carrier 18 is journalled on its forward bearing 372 mounted on shaft 326 and on its rear bearing 366 mounted on main shaft 355. The carrier mounts pinions 346 and 348, the latter pinion of which meshes with rear sun gear 354. This sun gear is keyed to main shaft 355 whose forward end is received by the axial bore of engine shaft 326 on pilot bearing means 356.

The motor drive gearing, 28B and 30B and overrunning clutch 38B, referred to hereinabove, are housed in a special casing section 420 secured to the rear of the casing section 336. The shaft 355 extends through and from the rear casing portion 420 and into a mechanical transmission casing 422 secured to casing section 420 and forming the rearmost component of the multiple casing assembly. Within casing portion 422 are gear-type transmission components for providing two forward and one reverse speeds, adapted to be selected by the driver. The rear extremity of the shaft 355 carries a driving gear 424 and is also formed with clutch 425. The rear end of the shaft 355 is also axially bored to support, as by the pilot bearing means 426, the forward extremity of the tailshaft 10B. Gear 424 drives the countershaft cluster 428 through countershaft driving gear 430 meshing with the gear 424, and the cluster 428 also includes a reduced speed forward drive countershaft gear 432 and a reverse drive countershaft gear 434, these gears being formed as an integral cluster as shown, and journaled upon a fixed shaft 435, although the details of such gear arrangement and mounting are of course subject to variation. Reduced speed forward drive countershaft gear 432 meshes with a gear 436 loose upon the tailshaft 10B and having clutch teeth 438 similar but opposed to the clutch teeth 425 and spaced therefrom. The conventional clutching element 440 is interposed between the clutching portions 425, 438 and slidably splined to the tailshaft 10B so that such shaft may be selectively coupled to the gear 436 for reduced speed higher torque drive, or directly to the shaft 355.

Countershaft reverse gear 434 meshes with a reverse idler (not shown) which in turn meshes with the main shaft reverse gear 442 in the usual manner; shifting means (not shown) also is provided for moving the clutch element 445 carried by the output shaft 10B between the gears 436, 442 to engage the clutch teeth 446 thereof with corresponding clutch teeth 448 carried by the adjoining face of the gear 442, such shifting means being so interrelated with the shifting means (not shown) for the clutch element 440 that clutch 445 can only be engaged when the clutch element 440 is in the neutral position. It will be seen that with the clutch element 445 engaged with the gear 442 a reverse gear drive is provided.

Reference may be made to Figure 7 to follow the operation of this third embodiment of transmission of the invention. It will be seen that no direct connection whatever between the sun gears is provided, although the first described arrangement employed direct connection means in the form of a roller-type overrunning clutch and the second described arrangement had such means in the form of a spring clutch. Starting the engine, as by towing, may be accomplished nevertheless by actuating the spring clutch 316 which will lock up the planetary gearset so as to be driven by rear sun gear 354 through the agency of pinion 348. Actuating means for the spring clutch, represented schematically in Figure 9 by a separately operatable switch SW9 and circuit 89, may be provided in the form of an electrically or a mechanically controllable device similar to that discussed in connection with Figure 6. This device, regardless of its nature, may also be used subsequent to parking the vehicle in order to lock the rear wheels to the engine and institute parking braking.

At the normal operating speeds above critical speed for the governor setting, the solenoid 80B, Figure 9, is energized, holding the spring clutch to lock up the planetary train and thereby affording engine braking when the accelerator pedal is released. As the vehicle slows down through the critical speed for the governor 82B, the contacts of switch SW5 open, deenergizing the spring clutch circuit 94B and declutching the clutch. Direct drag by the engine ceases since the carrier 18, which had been rotating in unison with the engine shaft, is freed therefrom and speeds up to leave the engine shaft 326 and its sun gear 352 as essentially the reaction members of the new system. The generator 22B has been disabled thus far due to the open circuited exciting coil 60B caused by release of the accelerator pedal. The generator and the exciter 23B are meantime rotating at the higher speed imparted to them by the speeded-up carrier when the hydraulic brake 305 is applied by the operator of the vehicle, switch SW8B operates contacts b to open first the circuit which connects the generator to the motors. The contacts c are operated to close the open exciter coil 60B circuit. In this circuit will be noted a resistor 99B incorporated to reduce the output of the generator under these conditions. Also operated by switch SW8 are the contacts a which throw a load onto the generator represented by resistor 98B. The engine and the dynamic braking are thus seen to be operating in effect in a parallel relation to slow down the rear wheels, the two sharing the load as it were.

At speeds above the critical governor speed, the engine is already tending to brake the rear wheels on a one-to-one basis following release of the accelerator pedal. Application of the brakes in that event adds the dynamic braking effect to the engine braking effect already in existence and together with the action of the hydraulic brakes tends to slow the rear wheels down drastically to the critical governor speed.

It will be evident that if the additive effect of the dynamic braking of the engine braking is desired at speeds below the critical governor speed, only one structural modification is required. This alteration is optional within the scope of the invention and amounts to adding an overrunning clutch to be interposed at bearing 356 of Figure 7. This device, indicated by reference numeral 260 on the schematic diagram of Fig. 8, insures a one-to-one braking action of the engine all the way down the speed range including that speed of the governor setting. The dynamic effect comes only upon application of the brakes and will then always be in addition to the engine braking effect rather than in a load sharing relation. Such a change has the added effect of eliminating a need for other equipment hereinabove described. That equipment was provided at the time to make possible towed or coasting type startings of the engine, which startings are automatically accomplished by an overrunning clutch. This clutch, while allowing the forward sun to overrun the rear sun, prevents the rear sun from turning at all without being accompanied by the forward sun. Thus when the wheels rotate, the engine must turn over as well. A further effect of adding the overrunning clutch would be to help synchronize the sun gears during electro-mechanical high-torque drive and remove any tendency of the spring clutch 316 to overheat due to drag.

Among the configurations disclosed in the foregoing, were: an A. C.-D. C. system providing for an electro-reverse, one drive motor, and dynamic braking introduced by release of the accelerator pedal as well as by depression of the brake pedal; and a D. C. system providing for a mechanical reverse, two drive motors, and dynamic braking introduced only by depression of the brake pedal. Between those embodiments as limits there is a wide variety of combinations within the broader aspects of the invention, e. g. the first embodiment could be changed to a straight D. C. system as it stands (necessitating addition of a second drive motor 26' shown in phantom in Fig. 3) or else have eliminated from it the accelerator actuated component of the dynamic braking system. It is to be understood that numerous modifications and changes in circuit arrangements and mechanical configurations may be made within the spirit of the invention.

What is claimed is:

1. In an electro-mechanical driving system characterized by a prime mover, an electrical generator means, and a mechanical load means, a planetary-differential driving assembly for operatively connecting the aforesaid means in load sharing relation to said prime mover, said assembly comprising a planet carrier, said planet carrier being adapted to be drivingly connected with the generating means, planetary gears carried by the carrier, a pair of sun gears meshing with the planetary gears, one of said sun gears comprising a driving gear adapted to be connected to the prime mover and the other a driven gear adapted to conduct the drive to the mechanical load means, and, in combination therewith, a two-way clutch device positively rotatably connected with a component of the planetary-differential assembly other than said driving sun gear and having a first position running entirely free of said driving sun gear, and second and third positions for locking up said driving sun gear and assembly, the two-way clutch device including coil spring means selectively tending either to unwind or coil in said second position assumed by the clutching device for establishing straight drive in the direction of said driving sun gear and tending either to coil or unwind respectively in said third position for establishing straight drive in the direction of said driven sun gear.

2. In an electro-mechanical driving system characterized by a prime mover, an electrical generator means, and a mechanical load means, a planetary-differential driving assembly for operatively connecting the aforesaid means in load sharing relation to said prime mover, said assembly comprising a planet carrier, said planet carrier being adapted to be drivingly connected with the generating means, planetary gears carried by the carrier, a pair of coaxial gears which mesh with the planetary gears and about which the planetary gears rotate, one of said coaxial gears comprising a driving gear adapted to be connected to the prime mover and the other a driven gear adapted to conduct the drive to the mechanical load means, and, in combination therewith, a two-way clutch device positively rotatably connected with a component of the planetary-differential assembly other than said coaxial driving gear and having a first position running entirely free of said driving gear, and second and third positions for locking up said driving gear and assembly, the two-way clutch device including coil spring means selectively tending either to unwind or coil in said second position assumed by the clutching device for establishing straight drive in the direction of said driving gear and tending either to coil or unwind respectively in said third position for establishing straight drive in the direction of said coaxial driven gear, and a one-way clutch device operatively associated with said coaxial gears for automatically permitting forward motion of said coaxial driving gear with respect to the driven gear and preventing forward motion of the driven gear with respect to the driving gear.

3. In an electro-mechanical driving system characterized by a prime mover, an electrical generator means, and a mechanical load means, a planetary-differential driving assembly for operatively connecting the aforesaid means in load sharing relation to said prime mover, said assembly comprising a planet carrier, said planet carrier being adapted to be drivingly connected with the generating means, planetary gears carried by the carrier, a pair of sun gears meshing with the planetary gears, one of said sun gears comprising a driving gear adapted to be connected to the prime mover and the other a driven gear adapted to conduct the drive to the mechanical load means, and, in combination therewith, a two-way clutch device positively rotatably connected with a component of the planetary-differential assembly other than said driving sun gear and having a first position running entirely free of said driving sun gear, and second and third positions for locking up said driving sun gear and assembly, the two-way clutch device including coil spring means selectively tending either to unwind or coil in said second position assumed by the clutching device for establishing straight drive in the direction of said driving sun gear and tending either to coil or unwind respectively in said third position for establishing straight drive in the direction of said driven sun gear, said coil spring means being axially spaced relative to the aforesaid gears.

4. In an electro-mechanical driving system characterized by a prime mover, an electrical generator means, and a mechanical load means, a planetary-differential driving assembly for operatively connecting the aforesaid means in load sharing relation to said prime mover, said assembly comprising a planet carrier, said planet carrier being adapted to be drivingly connected with the generating means, planet means carried by the carrier, a pair of coaxial gears which mesh with the planet means and about which the planet means rotates, one of said coaxial gears comprising a driving gear adapted to be connected to the prime mover and the other a driven gear adapted to conduct the drive to the mechanical load means, and, in combination therewith, a two-way clutch device positively rotatably connected with a component of the planetary-differential assembly other than said coaxial driving gear and having a first position running entirely free of said driving gear, and second and third positions for locking up said driving gear and assembly, the two-way clutch device including coil spring means selectively tending either to unwind or coil in said second position assumed by the clutching device for establishing straight drive in the direction of said driving gear and tending either to coil or unwind respectively in said third position for establishing straight drive in the direction of said coaxial driven gear, said coil spring means being coaxial with said coaxial gears and of lesser radial extent than either.

5. In an electro-mechanical driving system characterized by a prime mover, an electrical generator means, and a mechanical load means, a planetary-differential driving assembly for operatively connecting the aforesaid means in load sharing relation to said prime mover, said assembly comprising a planet carrier, said planet carrier being adapted to be drivingly connected with the generating means, planet means carried by the carrier, a pair of coaxial gears which mesh with the planet means and about which the planet means rotates one of said coaxial gears comprising a driving gear adapted to be connected to the prime mover and the other a driven gear adapted to conduct the drive to the mechanical load means, and, in combination therewith, a two-way clutch device positively rotatably connected with a component of the planetary-differential assembly other than said driving gear and having a first position running entirely free of said driving gear, and second and third positions for locking up said driving gear and assembly, the two-way clutch device including coil spring means selectively tending either to unwind or coil in said second position assumed by the clutching device for establishing straight drive in the direction of said driving gear and tending either to coil or unwind respectively in said third position for establishing straight drive in the direction of said driven gear, said coil spring means being coaxial with the planetary-differential assembly and entirely within the axial extent thereof.

6. In an automotive transmission system characterized by a prime mover, an electrical generating means, and a mechanical load means, the combination with a mechanical gear-type transmission, an input member for operatively connecting the transmission to the prime mover, an output member coaxial with the input member for divingly connecting the transmission with the mechanical load means, and an output structure disposed transverse to the axis of the input member for establishing drive with the electrical generating means, the aforesaid output units being adapted for operating in load sharing relation, said gear-type transmission comprising a dual planetary system including two adjacent and coaxial planetary gearsets, each gearset comprising a sun gear and planet gears, a carrier carrying the planet gears of both gearsets, said dual system having two driving portions and two driven portions, one of said driving portions and one of said driven portions being connected to said carrier, the other driving portion rotatably connecting the input member to one of the sun gears and the other driven portion rotatably connecting the output member to the other of the sun gears, of clutch means connected to each of said driving portions and engageable to lock up said dual planetary system to establish direct drive therethrough, and means lying laterally outside of said clutch means for establishing cooperation between said one driven portion and said output structure, said last-named means including hypoid gearset means for providing drive of said output structure when so disposed that the mutually parallel planes containing the rotational axes of said output structure and input member lie in predeterminedly spaced relation.

7. In an automotive transmission system characterized by a prime mover, an electrical generating means, and a mechanical load means, the combination with a mechanical gear-type transmission, an input member for operatively connecting the transmission to the prime mover, an output member coaxial with the input member for drivingly connecting the transmission with the mechanical load means, and an output structure for establishing drive with the electrical generating means, the aforesaid output parts being adapted for operating in load sharing relation, said gear-type transmission comprising a dual planetary system including two adjacent and coaxial planetary gearsets, each gearset comprising a sun gear and planet gears, a carrier carrying the planet gears of both gearsets, said dual system having two driving portions and two driven portions, one of said driving portions and one of said driven portions being connected to said carrier, the other driving portion rotatably connecting the input member to a certain sun gear and the other driven portion rotatably connecting the output member to the remaining sun gear, one of said sun gears being provided with an axial cavity forming means defining a pilot bearing recess and the other of said sun gears including an axial projection overhung relative to the drive portion associated with said other sun gear and journalled in said pilot bearing recess, of a two-way clutch device having operative positions whereby a positive drive is effected between the aforesaid driving portions, said clutch device including coil spring means operable from free spring position into both a more coiled disposition and a more unwound disposition to render said clutch device selectively into said operative positions.

8. In an automotive transmission system characterized by a prime mover, an electrical generating means, and a mechanical load means, the combination with a mechanical gear-type transmission, an input structure for operatively connecting the transmission to the prime mover, an output member coaxial with the input member for drivingly connecting the transmission with the mechanical load means, and an output structure for establishing drive with the electrical generating means, the aforesaid output units being adapted for operating in load sharing relation, said gear-type transmission comprising a dual planetary system including two adjacent and coaxial planetary gearsets, each gearset comprising a sun gear and planet gears, a carrier carrying the planet gears of both gearsets, said dual system having two driving portions and two driven portions, one of said driving portions and one of said driven portions being connected to said carrier, the other driving portion rotatably connecting the input structure to a sun gear of a certain gearset and the other driven portion rotatably connecting the output member to the sun gear of the remaining gearset, one of said sun gears being provided with an axial cavity forming means defining a pilot bearing recess and the other of said sun gears including an axial projection overhung relative to the drive portion associated with said other sun gear and journalled in said pilot bearing recess, said pilot bearing being transversely aligned with said one sun gear, of a two-way clutch device having operative positions whereby a positive drive is effected between the aforesaid driving portions, said clutch device including coil spring means operable from free spring position into both a more coiled disposition and a more unwound disposition to render said clutch device selectively into said operative positions.

9. In an automotive transmission system characterized by a prime mover, an electrical generating means, and a mechanical load means, the combination with a mechanical gear-type transmission, an input member for operatively connecting the transmission to the prime mover, an output member coaxial with the input member for drivingly connecting the transmission with the mechanical load means, and an output element for establishing drive with the electrical generating means, the aforesaid output structures being adapted for operating in load sharing relation, said gear-type transmission comprising a dual planetary system including two adjacent and coaxial planetary gearsets, each gearset comprising a sun gear and planet gears, a carrier carrying the planet gears of both gearsets, said dual system having two driving portions and two driven portions, one of said driving portions and one of said driven portions being connected to said carrier, the other driving portion rotatably connecting the input member to the sun gear of a certain gearset and the other driven portion rotatably connecting the output member to a sun gear of the remaining gearset, one of said sun gears being provided with an axial cavity forming means defining a pilot bearing recess and said other sun gear including an axial projection overhung relative to the drive portion associated therewith and journalled in said pilot bearing recess, the respective planes of rotation of said pilot bearing and one sun gear being in axially spaced relation, of a two-way clutch device having operative positions whereby a positive drive is effected between the aforesaid driving portions, said clutch device including coil spring means operable from free spring position into both a more coiled disposition and a more unwound disposition to render said clutch device selectively into said operative positions.

10. In an automotive transmission system characterized by a prime mover, an electrical generating means, and a mechanical load means, the combination with a mechanical gear-type transmission, an input member for operatively connecting the transmission to the prime mover, an output member coaxial with the input member for drivingly connecting the transmission with the mechanical load means, and an output element for establishing drive with the electrical generating means, the aforesaid output structures being adapted for operating in load sharing relation, said gear-type transmission comprising a dual planetary system including two adjacent and coaxial planetary gearsets, each gearset comprising a sun gear and planet gears, a carrier carrying the planet gears of both gearsets, said dual system having two driving portions and two driven portions, one of said driving portions and one of said driven portions being connected to said carrier, the other driving portion rotatably connecting the input member to the sun gear of one of said gearsets and the other driven portion rotatably connecting the output member to the sun gear of the other gearset, a certain sun gear being provided with an axial cavity forming means defining a pilot bearing recess and the remaining sun gear including an overhung axial projection journalled in said pilot bearing recess, said axial cavity forming means further defining an associated recess disposed about said axial projection, of a two-way clutch device having operative positions whereby a positive drive is effected between the aforesaid driving portions, said clutch device including coil spring means operable from free spring position into both a more coiled disposition and a more unwound disposition to render said clutch device selectively into said operative positions, and means including a plurality of clutch elements disposed in said associated recess in a disengaged position permitting forward motion of one of said sun gears relative to the other sun gear and engageable to prevent unwanted forward motion of said other sun gear relative to said one sun gear.

11. In an automotive transmission system characterized by a prime mover, an electrical generating means, and a mechanical load means, the combination with a mechanical gear-type transmission, an input member for operatively connecting the transmission to the prime mover, an output member coaxial with the input member for drivingly connecting the transmission with the mechanical load means, and an output structure for establishing drive with the electrical generating means, the aforesaid output units being adapted for operating in load sharing relation, said gear-type transmission comprising a dual planetary system including two adjacent and coaxial planetary gearsets, each gearset comprising a sun gear and planet gears, a carrier carrying the planet gears of both gearsets, said dual system having two driving portions and two driven portions, one of said driving portions and one of said driven portions being connected to said carrier, the other driving portion rotatably connecting the input member to the sun gear of a certain gearset and the other driven portion rotatably connecting the output member to the sun gear of the remaining gearset, one of said sun gears being provided with an axial cavity forming means defining a pilot bearing recess and the other sun gear including an axially overhung projecting portion journalled in said pilot bearing recess, said pilot bearing being transversely aligned with said one sun gear, of a two-way clutch device having operative positions whereby a positive drive is effected between the aforesaid driving portions, said clutch device including coil spring means operable from free spring position into both a more coiled disposition and a more unwound disposition to render said clutch device selectively into said operative positions, said output structure being disposed adjacent said carrier in an arrangement whereby mutual cooperation may be afforded with the said one driven portion therefor, and positive connection means including sets of interfitting companion projections for establishing said mutual cooperation.

12. In an automotive transmission system characterized by a prime mover, an electrical generating means, and a mechanical load means, the combination with a mechanical gear-type transmission, an input member for operatively connecting the transmission to the prime mover, an output member coaxial with the input member for drivingly connecting the transmission with the mechanical load means, and an output structure for establishing drive with the electrical generating means, the aforesaid output units being adapted for operating in load sharing relation, said gear-type transmission comprising a dual planetary system including two adjacent and coaxial planetary gearsets, each gearset comprising a sun gear and planet gears, a carrier carrying the planet gears of both gearsets, said dual system having two driving portions and two driven portions, one of said driving portions and one of said driven portions being connected to said carrier, the other driving portion rotatably connecting the input member to the sun gear of a certain gearset and the other driven portion rotatably connecting the output member to the sun gear of the remaining gearset, one of said sun gears being provided with an axial cavity forming means defining a pilot bearing recess and the other sun gear including an axially overhung projecting portion journalled in said pilot bearing recess, said pilot bearing being transversely aligned with said one sun gear, of a two-way clutch device having operative positions whereby a positive drive is effected between the aforesaid driving portions, said clutch device including coil spring means operable from free spring position into both a more coiled disposition and a more unwound disposition to render said clutch device selectively into said operative positions, said output structure being disposed adjacent said carrier in an arrangement whereby mutual cooperation may be afforded with the said one driven portion therefor, and positive connection means including sets of interfitting companion projections for establishing said mutual cooperation, at least one of said sets of interfitting companion projections being transversely aligned with respect to said two-way clutch device and in radial spacing thereto.

13. In an automotive transmission system characterized by a prime mover, an electrical generating means, and a mechanical load means, the combination with a mechanical gear-type transmission, an input member for operatively connecting the transmission to the prime mover, an output member coaxial with the input member for drivingly connecting the transmission with the mechanical load means, and an output structure for establishing drive with the electrical generating means, the aforesaid output units being adapted for operating in load sharing relation, said gear-type transmission comprising a dual planetary system including two adjacent and coaxial planetary gearsets, each gearset comprising a sun gear and planet gears, a carrier carrying the planet gears of both gearsets, said dual system having two driving portions and two driven portions, one of said driving portions and one of said driven portions being connected to said carrier, the other driving portion rotatably connecting the input member to the sun gear of a certain gearset and the other driven portion rotatably connecting the output member to the sun gear of the remaining gearset, one of said sun gears being provided with an axial cavity forming means defining a pilot bearing recess and the other sun gear including an axially overhung projecting portion journalled in said pilot bearing recess, said pilot bearing being transversely aligned with said one sun gear, of a two-way clutch device having operative positions whereby a positive drive is effected between the aforesaid driving portions, said clutch device including coil spring means operable from free spring position into both a more coiled disposition and a more unwound disposition to render said clutch device selectively into said operative positions, said output structure being disposed adjacent said carrier in an arrangement whereby mutual cooperation may be afforded with the said one driven portion therefor, and positive connection means including sets of interfitting companion projections for establishing said mutual cooperation, both sets of said interfitting companion projections being axially displaced relative to said two-way clutch device.

14. In an automotive transmission system characterized by a prime mover, an electrical generating means, and a mechanical load means, the combination with a mechanical gear-type transmission, an input member for operatively connecting the transmission to the prime mover, an output member coaxial with the input member for drivingly connecting the transmission with the mechanical load means, and an output element for establishing drive with the electrical generating means, the aforesaid output structures being adapted for operating in load sharing relation, said gear-type transmission comprising a dual planetary system including two adjacent and coaxial planetary gearsets, each gearset comprising a sun gear and planet gears, a carrier carrying the planet gears of both gearsets, said dual system having two driving portions and two driven portions, one of said driving portions and one of said driven portions being connected to said carrier, the other driving portion rotatably connecting the input member to the sun gear of the first of the two gearsets and the other driven portion rotatably connecting the output element to the sun gear of the second of the two gearsets, a certain of the sun gears being provided with an axial cavity forming means defining a pilot bearing recess and the remaining sun gear including an axial projection overhung relative to its associated drive portion and journalled in said pilot bearing recess, said pilot bearing being transversely aligned with said certain sun gear, of a two-way clutch device having operative postions whereby a positive drive is effected between the aforesaid driving portions, said clutch device including coil spring means operable from free spring position into both a more coiled disposition and a more unwound disposition to render said clutch device selectively into said operative positions, said output structure being disposed adjacent said carrier in an arrangement whereby mutual cooperation may be afforded with said one driven portion therefor, and positive connection means including sets of interfitting companion projections for establishing said mutual cooperation, said sets of interfitting companion projections having intersecting planes of rotation and converging axes of rotation which latter at point of nearest approach maintain a predeterminedly spaced relation thereby affording disposition of said output element on a level removed from the level of said carrier and members.

15. In a power transmitting system, an input member including a first gear arranged to be driven by a source of power, an output member including a second gear adapted to deliver power, said gears being relatively rotatable adjacent one another in coaxial spaced relation, a reaction output structure including a gear cluster operatively interconnecting the aforesaid gears and rotatable thereabout, said members each being provided with means forming companion axial recesses defined by inner annulus structure and outer annulus structure, a coil spring disposed in the axial recess of said output member and having one end rotatably engaged therewith, said coil spring extending into the axial recess of said input member and having its other end free and terminating therein, and friction means having an operative position for establishing frictional contact between the free end of the spring and the input member whereby when a certain of the two said gears attempts forward motion relative to the other gear, the friction drag exerted by the friction means will cause the spring to expand to grip the outer annulus structure and establish direct drive of a one-way direction as between the two gears, and whereby when the other of the two said gears attempts forward motion relative to the said one gear, the friction drag exerted by the friction means will cause the spring to contract to grip the inner annulus structure and establish direct drive of an opposite-way direction as between the two gears.

16. In a variable torque power transmission system, torque dividing means comprising a rotatable power input part and rotatable output and reactive torque members connected in mechanical parallelism thereto, and drive means associated with one of said members and including operating means for operating it to establish driving cooperation in a first position of the drive means from said part to said one member, and in a second position of the drive means from said one member to said part, said drive means comprising a clutching device including coil spring means having an end made fast to said one member and a free end adapted for limited rotation with respect to said one member, said operating means effectively acting on said free end in a manner such as either to coil the spring means additionally or to unwind the spring means and thereby cause assumption respectively by said drive means of a certain of the aforesaid positions or the other of the aforesaid positions, said one member being the rotatable reactive torque member wherein is provided an axial recess for securably receiving said coil spring means, said rotatable power input part being otherwise freely rotatable respecting said rotatable output member and said rotatable output member being otherwise freely rotatable respecting said power input part but for the restraint imposable by said clutching device.

17. In a power transmitting system, an input member including a first gear arranged to be driven by a source of power, an output member including a second gear adapted to deliver power, said gears being relatively rotatable adjacent one another in coaxial spaced relation, a reaction output structure including a gear cluster operatively interconnecting the aforesaid gears and rotatable thereabout, said members each being provided with means forming companion axial recesses defined by inner annulus structure and outer annulus structure, a coil spring disposed in the axial recess of one of said members and having one end rotatably engaged therewith, said coil spring extending into the axial recess of the other of said members and having the other end terminating freely therein, and friction means having an operative position for establishing frictional contact between the free end of the spring and said other member whereby when a certain of the two said gears attempts forward motion relative to the other gear, the friction drag exerted by the friction means will cause the spring to expand to grip the outer annulus structure and establish direct drive of a one-way direction as between the two gears, and whereby when the other of the two said gears attempts forward motion relative to the said one gear, the friction drag exerted by the friction means will cause the spring to contract to grip the inner annulus structure and establish direct drive of an opposite-way direction as between the two gears, said companion axial recesses and coil spring all extending laterally of both sides of a certain of said gears in an axial direction and all lying medially of said certain gear in a radial direction.

18. In a variable torque power transmission system, torque dividing means comprising a rotatable power input part and rotatable output and reactive torque members connected in mechanical parallelism thereto, and drive means associated with one of said members and including operating means for operating it to establish driving cooperation in a first position of the drive means from said part to said one member, and in a second position of the drive means from said one member to said part, said drive means comprising a clutching device including coil spring means having an end made fast to said one member and a free end adapted for limited rotation with respect to said one member, said operating means acting on said free end in a manner such as either to coil the spring means additionally or to unwind the spring means and thereby cause assumption respectively by said drive means of a certain of the aforesaid positions or the other of the aforesaid positions, said one member being the rotatable reactive torque member wherein is provided an axial recess for securably receiving said coil spring means, said operating means comprising a finger portion rotatably carried by the power input part for axial shift relative thereto, and a drag portion presenting a friction surface complementary to said finger portion and being adapted for rotational movement with the free end of said coil spring means.

19. In an electro-mechanical driving system characterized by an electrical generator and a mechanical load and a prime mover power source therefor, a transmission including a planetary-differential driving gear assembly, a carrier and driving and driven coaxial gears incorporated therein, said driving and driven coaxial gears being provided one with an axial bearing recess and the other with a pilot stub shaft journalled therein, said coaxial gears having no direct mutual connection and being relatively rotatable, planetary gears carried by said carrier for rotation about said coaxial gears and being effective for establishing an indirect mutual straight drive connection between said coaxial gears upon restraint of motion of the carrier, an input member carrying said coaxial driving gear and extending forward from said assembly for effecting connection with said power source, a certain set of hypoid gear teeth drivingly connected to said carrier and disposed in radial spacing about said input member, a companion set of hypoid gear teeth so arranged for meshing with said certain set as to have an axis of rotation spaced from both the plane of rotation and axis of rotation of said certain set, a first output member mounting said companion set of hypoid gear teeth and extending axially thereof for effecting a connection to said electrical generator, an output structure carrying said coaxial driven gear and extending rearward from said assembly for effecting a connection with said mechanical load, said carrier and planetary gears tending, when said input member drives, to unload said coaxial driven gear and output structure and to share the input torque burden therewith and allow reduced speed operation therefor, and further tending when said output structure acts to drive, to unload said coaxial driving gear and input structure and to share the torque burden imposed thereon and allow reduced speed operation therefor, and means including a coil spring clutch having tight wound and loose wound operative positions for effecting an indirect straight drive connection between said coaxial gears by locking said carrier to said input member, said coil spring clutch extending generally from the plane of said certain set of hypoid gear teeth coaxially forward along said input member and operating in a certain of said wound positions and when said input member drives, to cause the supplied torque to be applied to said coaxial driven gear on a one to one speed basis, and further operating in the other of said wound positions and when said output structure acts to drive, to cause torque to be applied to said coaxial driving gear and input member on a relative speed basis which is mechanically fixed irregardless of the resistance afforded by said carrier and output member such that the latter value produces an additive effect as distinguished from a load sharing effect.

20. In a power transmission system, a primary power shaft, a primary load shaft in the plane of the primary power shaft and aligned therewith, a secondary load shaft located in a plane at right angles to the first-named plane, a planetary-differential assembly comprising members including a carrier rotatable about an axis coincident with that of said primary shafts, said primary shafts being geared to one another through said planetary-differential assembly, clutch means in the planetary-differential assembly effective between at least two members thereof to hold the members aforesaid against relative rotation for providing a 1:1 drive through the planetary-differential, a gear on one side of the first-named plane connected to said secondary load shaft for rotation therewith, an electrical generator assembly concentric with and driven by said secondary load shaft, and a second gear mounted to said carrier meshing with the gear on said secondary load shaft to provide a geared connection between said planetary-differential and generator assemblies.

21. In a variable torque power transmission system, torque dividing means comprising a rotatable power input part and rotatable output and reactive torque members connected in mechanical parallelism thereto, and drive transmitting means associated with one of said members and including operating means for operating said drive transmitting means to establish driving cooperation in a first position of the drive transmitting means from said part to said one member, and in a second position of the drive transmitting means from said one member to said part, said part and the other of the said members comprising shafts disposed coaxially with respect to one another and each having an end portion relatively adjacent an end portion of the other, and a one-way clutch portion connected to each of said relatively adjacent shaft end portions and engageable to provide a one-way connection from said other member to said part and thereby cause said other member to drive said part in a one-way drive, the drive transmitting means aforesaid comprising a clutching device including coil spring means having an end made fast to said one member and a free end adapted for limited rotation with respect to said one member, said operating means being effective to act on said free end in a manner such as either to coil the spring means additionally or to unwind the spring means and thereby cause assumption respectively of said drive transmitting means of a certain of the aforesaid positions or the other of the aforesaid positions, said one member being the rotatable reactive torque member wherein is provided an axial recess for securably receiving said coil spring means and said other member being the rotatable output member.

GEORGE L. McCAIN.

REFERENCES CITED

The following references are of record in the file of this patent:

UNITED STATES PATENTS

| Number | Name | Date |
| --- | --- | --- |
| 1,076,614 | Thomas | Oct. 21, 1913 |
| 1,410,384 | DeMartino | Mar. 21, 1922 |
| 1,428,221 | DeMartino | Sept. 5, 1922 |
| 2,229,654 | Hubbell | Jan. 28, 1941 |
| 2,355,000 | Liebrecht | Aug. 1, 1944 |
| 2,410,921 | Avila | Nov. 12, 1946 |

FOREIGN PATENTS

| Number | Country | Date |
| --- | --- | --- |
| 822,087 | France | Dec. 20, 1937 |